United States Patent [19]

Brahmavar et al.

[11] Patent Number: 4,687,977
[45] Date of Patent: Aug. 18, 1987

[54] ELECTRONICALLY CONTROLLED MOTOR AND METHODS OF OPERATING SAME

[75] Inventors: Subhash M. Brahmavar; Ernest W. Litch, III, both of Fort Wayne, Ind.

[73] Assignee: General Electric Company, Fort Wayne, Ind.

[21] Appl. No.: 663,654

[22] Filed: Oct. 22, 1984

[51] Int. Cl.⁴ ........................................... H02K 29/00
[52] U.S. Cl. .................................. 318/492; 318/254; 310/68 R; 310/68 C
[58] Field of Search ............... 310/180, 184, 198, 310, 310/68 R, 68 C; 318/254, 492

[56] References Cited

U.S. PATENT DOCUMENTS

| | | | |
|---|---|---|---|
| 2,319,614 | 5/1943 | Linville | 310/184 |
| 3,633,057 | 1/1972 | Smith et al. | 310/184 |
| 3,774,062 | 11/1973 | Johnson | 310/184 |
| 3,906,321 | 9/1975 | Salihi | 318/492 |
| 4,100,444 | 7/1978 | Boyd, Jr. | 310/184 |
| 4,169,990 | 10/1979 | Erdman | 318/254 |
| 4,390,826 | 6/1983 | Erdman et al. | 318/439 |
| 4,491,772 | 1/1985 | Bitting | 318/254 |
| 4,494,055 | 1/1985 | Bitting et al. | 318/254 |
| 4,499,408 | 2/1985 | Bitting et al. | 318/254 |
| 4,500,821 | 2/1985 | Bitting et al. | 318/254 |

*Primary Examiner*—William M. Shoop, Jr.
*Assistant Examiner*—Bentsu Ro
*Attorney, Agent, or Firm*—Ralph E. Krisher, Jr.

[57] ABSTRACT

Method of operating an electronically commutated motor, controlled by a board mounted electronic circuit, wherein current surges in such circuit are suppressed while dissipating heat associated with such suppression from motor structure as opposed to the control circuit. The heat associated with control circuit current surge suppression is dissipated into the bowels of the motor as opposed to being dissipated from a heat generating resistor mounted on the control circuit board as has been done heretofore. Illustrated structure includes current surge suppressing special winding turns on the motor core. Such special winding turns are connected with a known electronic control circuit so that power supplied to such circuit is transmitted through the special winding on the motor. Current surges associated with operation of the motor control circuit are then suppressed, during operation, by the special winding inside the motor.

14 Claims, 7 Drawing Figures

ELECTRONICALLY CONTROLLED MOTOR AND METHODS OF OPERATING SAME

The present invention relates generally to electronically controlled motors, and more particularly to electronically commutated or brushless DC motors.

CROSS-REFERENCE TO RELATED APPLICATIONS

Related applications are: Bitting et al application Ser. No. 502,601 now U.S. Pat. No. 4,499,408; Bitting application Ser. No. 502,663 now U.S. Pat. No. 4,491,772; Bitting et al application Ser. No. 502,599 now U.S. Pat. No. 4,500,821; and Bitting et al application Ser. No. 502,594 now U.S. Pat. No. 4,494,055—all of which were filed June 9, 1983, and all of which are now allowed. Also related is Peil application Ser. No. 425,522 filed Sept. 28, 1982. Erdman et al U.S. Pat. No. 4,390,826 of June 26, 1983, and Erdman U.S. Pat. No. 4,169,990 of Oct. 2, 1979, also contain related subject matter. The entire subject matter of all of the just-mentioned applications and patents is specifically incorporated herein by reference.

BACKGROUND OF THE INVENTION

Electronic control circuit elements used in conjunction with different types of motors are often packaged in close proximity to component parts of such motors such as the motor stator and rotor. In many cases, such elements are essentially enclosed within a housing of one type or another, and heat generated by one or more of such elements may contribute to ambient temperatures in the vicinity of various ones of the circuit elements such that malfunction or premature failure of an element may occur.

In the specific case of electronic controls used in brushless DC motors as depicted, for example, in the patent applications and patents incorporated by reference hereinabove; the circuit elements thereof include power switches (e.g., transistors), fuses, and other semiconductor components which are susceptible to current surges. Normally, a surge suppressing resistor has also been used in the control to reduce the peak of such surge so that premature failure of various circuit elements, including those herein mentioned as being surge susceptible, does not occur.

As a point of reference, such a surge suppressing resistor is shown, in all of the above incorporated by reference Bitting and Bitting et al applications, as a three ohm resistor R22 in FIG. 2 of such application drawings. The above incorporated by reference Peil application also illustrates the use of such a surge suppressing resistor in the form of a five ohm resistor denoted by the reference numeral 25 in FIG. 1 of the Peil application drawings.

While the use of surge suppressing resistors diminish the negative effects of current surges, such resistors significantly contribute to the undesirable elevated ambient temperature problem for components mounted on the control circuit board with a surge resistor.

While it would be desirable to avoid the heating effect of surge suppressing resistors, heretofore there has been no apparent possibility of eliminating such resistors from the control circuits. For example, in the case of a ceiling fan application with a wall control as disclosed in the above-referenced Peil application, the triac action in the wall control creates current surges, the peak of which is four times the average current. Surges of this magnitude are not only harmful to transistors, diodes, and so forth, but also can cause fatigue in circuit board located fuses and cause premature fuse failure. For this reason also, surge suppression becomes essential.

It should now be understood that it would be desirable to provide methods of suppressing current surges in electronic motor control circuit components without significantly contributing to increased heating of the control circuit board or other environment surrounding such components. It would also be desirable to provide current surge suppressing means that protect circuit board mounted components without having a heating effect on such board and its ambient. Furthermore, it would be desirable to provide an improved combination of an electric motor and its associated electronic circuitry such that problems associated with circuit element heating are overcome.

Accordingly, it is a general object of the present invention to provide solutions to the problems mentioned above.

It is a specific object of the present invention to provide improved methods of operating electronically controlled motors that involve suppressing current surges in an electronic motor control circuit while dissipating heat associated with such suppressing procedure at a location remote from the circuit board that carries the circuit elements being surge protected.

It is another object of the present invention to provide current surge suppressing means for protecting circuit board mounted electronic motor control components without directly heating the protected components with the suppressing means.

A more specific object of the present invention is to provide an improved combination of an electric motor and electric circuitry associated therewith in order to overcome heating problems associated with such circuitry.

SUMMARY OF THE INVENTION

In accordance with one form of the invention in one specific illustrated embodiment shown herein, we have provided a method of operating an electronically commutated motor, controlled by a board mounted electronic circuit, wherein we suppress current surges in such circuit while dissipating heat associated with such suppressing procedure along with the heat dissipated during energization of the motor. In this manner, the heat associated with current surge suppression for the control circuit is dissipated into the bowels of the motor as opposed to being dissipated from a heat generating resistor mounted on the control circuit board as has been done heretofore.

As illustrated herein, we provide current surge suppressing special winding turns on the core of a motor to be controlled such that the special winding turns have no net inductive effect within the motor. We then interconnect such special winding turns with a known electronic control circuit so that power supplied to such circuit is transmitted through the special winding on the motor. Current surges associated with operation of the motor control circuit are then suppressed, during operation, by the special winding in the motor. The result is that elements on the electronic circuit control board are current surge protected. However, heat associated with the current surge suppression provided by the special motor winding is dissipated at the location of the special winding—that is into the motor stator and its immediate environment rather than into the immediate environment of the control circuit board.

BRIEF DESCRIPTION OF THE DRAWINGS

The subject matter which is regarded as the present invention is particularly pointed out and distinctly claimed in the concluding portion of this specification. The invention itself, however, taken with further objects and advantages thereof, may best be understood by reference to the following description taken in conjunction with the accompanying drawings in which:

DETAILED DESCRIPTION

Figure 1:
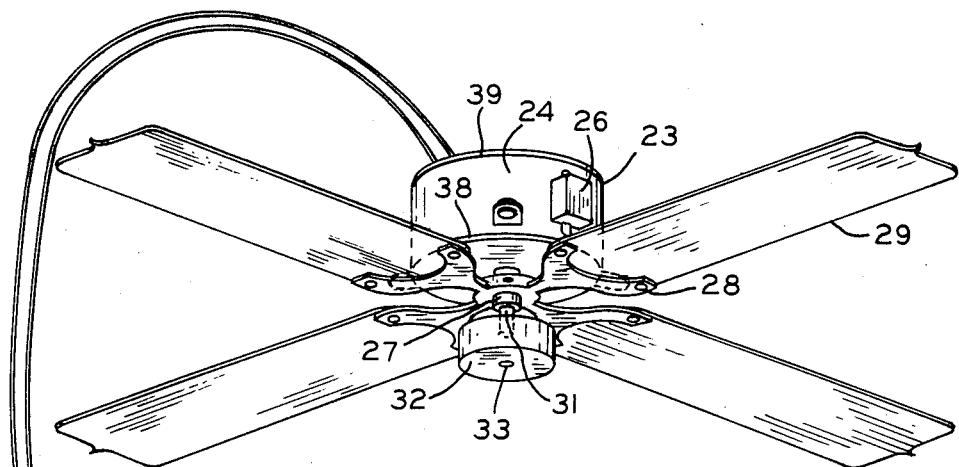
FIG. 1 is a perspective view of a wall controlled electronically commutated motor, fan, and not shown light fixture constructed and controlled in accordance with the above-referenced applications and patents.

FIG. 1 is illustrative of a motor-fan-wall-control combination and a not shown light fixture substantially the same as that shown in the above-referenced Peil application Ser. No. 425,522, with the exception that the combination illustrated in FIG. 1 hereof incorporates an embodiment of our invention with which aspects of our invention may be practiced.

The combination illustrated in FIG. 1 includes a wall mounted controller W and a three stage electronically commutated motor 23 (also known in the art as a brushless DC motor having a three phase stator). Physically mounted to the shell 24 of the motor is an electromagnetic interference filter 26 purchased as part number NF10869-521 from Cornell Dubilier Corporation. As will be understood by persons skilled in the art, the purpose of the filter 26 is to filter radio frequency interfering electromagnetic radiation that might otherwise be introduced to the power lines from the motor 23 and its associated control circuitry.

Attached to the shaft 27 of the motor 23 is a fan assembly which includes a hub and blade mounting means 28 and four substantially identical fan paddles or blades 29. As will be appreciated from an inspection of FIG. 1, an electrical conduit 31 extends from the hollow shaft 27 and such conduit supports a control board chamber 32. Normally, an incandescent light fixture is suspended from a tapped hole 33 formed in the chamber 32 all as described in detail in the above-referenced Peil application. For simplicity of disclosure, such a light fixture has been omitted from FIG. 1. However, it is to be understood that such a fixture often will be present and that the power for such fixture may be adjustably controlled by one of the concentric knobs on the wall controller W, while the other knob controls operation of the motor 23 and thus the fan—all as described in detail in the referenced Peil application.

As will be understood, an AC line 34 enters the conduit box for the wall control W. One side of the line is interconnected with the circuitry of the wall mounted controller W as described in the above-referenced Peil application and thence is connected through a line T3 to the motor-control assembly. The other side of the AC line 34 is directly connected via conductor T6 to the motor-control combination. For ease of understanding and comparison with the just-mentioned Peil application, the lines T3 and T6 illustrated in FIG. 1 correspond with lines connected to terminals T3 and T6 in the Peil application.

The control circuit board contained within the control board chamber 32 is substantially identical to the control described in detail in Bitting et al application Ser. No. 502,601 as will be described in more detail hereinbelow. However, for the moment, and with combined reference to FIGS. 4, 2, 3, and 1, it simply is noted that a circuit board generally denoted by the reference numeral 37 is mounted in the conduit box or control board chamber 32 and thus is remotely located relative to the motor 23 or the motor housing 24 or motor end frames 38, 39.

Heretofore (prior to the present invention) wall controls and fan and motor control assemblies have been known to generally conform with the above-referenced Bitting, Bitting et al, and Peil applications; and a current surge suppressing wire wound resistor R2 (see FIG. 2) would be mounted to the circuit board 37. The resistor R2 along with the board 37 and all other components mounted thereon were confined within the conduit box or chamber 32, and thus the circuit elements mounted to circuit board 37 were subjected not only to the heat dissipated from the transistors, diodes, capacitors, and other elements on such board, but also heat dissipated from the current surge suppressing resistor R2.

For reasons addressed in the beginning portion of this application, it is desirable to attempt to eliminate the resistor R2 and its undesired heating effects. Thus, and in accordance with one aspect of our invention, (see FIG. 3) the resistor R2 is removed from circuit board 37 and replaced by a jumper conductor 42. Current surge protection is still provided in the arrangement shown in FIG. 1, however, by supplying power to the motor controlling circuitry on board 37 through a special winding located in the bowels of the motor 23. Such winding is especially designed to provide a desired amount of resistance (for example from 3 to 9 ohms) and to have no net inductive effect on, or coupling with, flux inside the motor. These aspects are described in more detail hereinbelow. However, reference is now made to FIGS. 4 and 5 for a description of the circuit board 37 and the elements mounted thereon in order to comply with the disclosure requirements of the patent statutes.

The control circuit of FIG. 5 will now be described by comparison with the control circuit shown in FIG. 2 of the above-referenced Bitting et al application Ser. No. 502,601. For practical purposes, and with the exception of the elimination of a three ohm current surge limiting resistance identified as "R22" in the circuit of FIG. 2 of the Bitting et al application, the circuit of FIG. 5 herein is essentially identical in content and function to the circuit of FIG. 2 in the referenced application.

Figure 4:
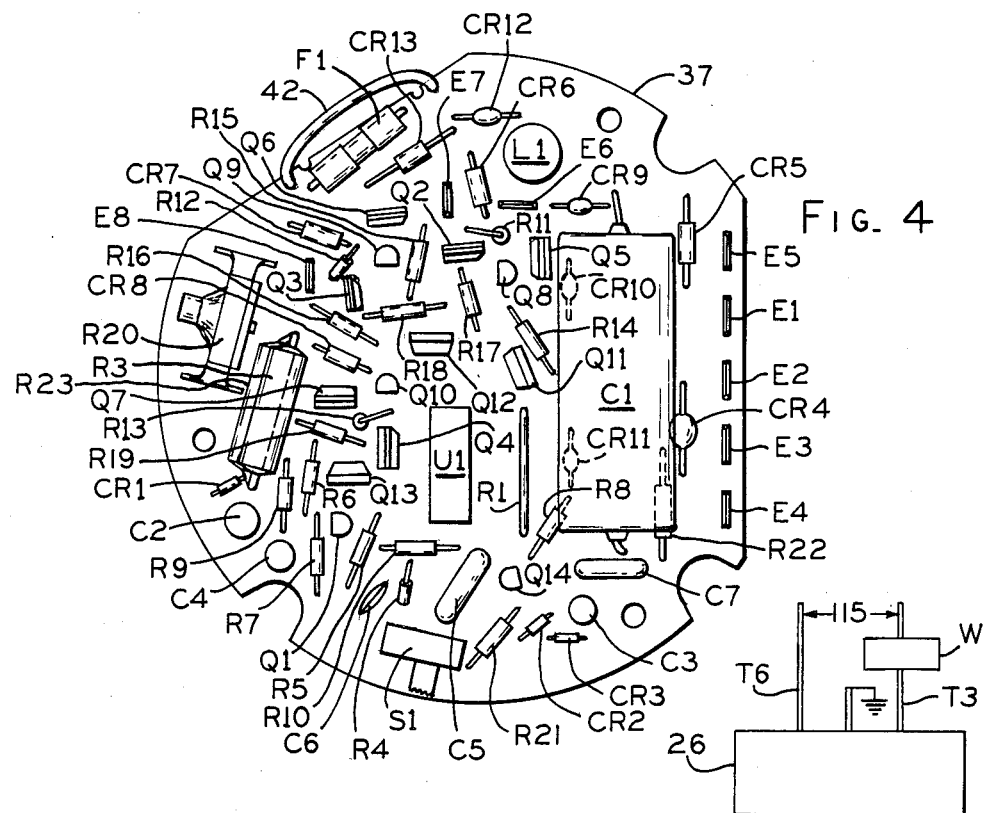
FIG. 4 is a plan view of a complete circuit board, a portion of which is illustrated in FIG. 3.
Figure 5:
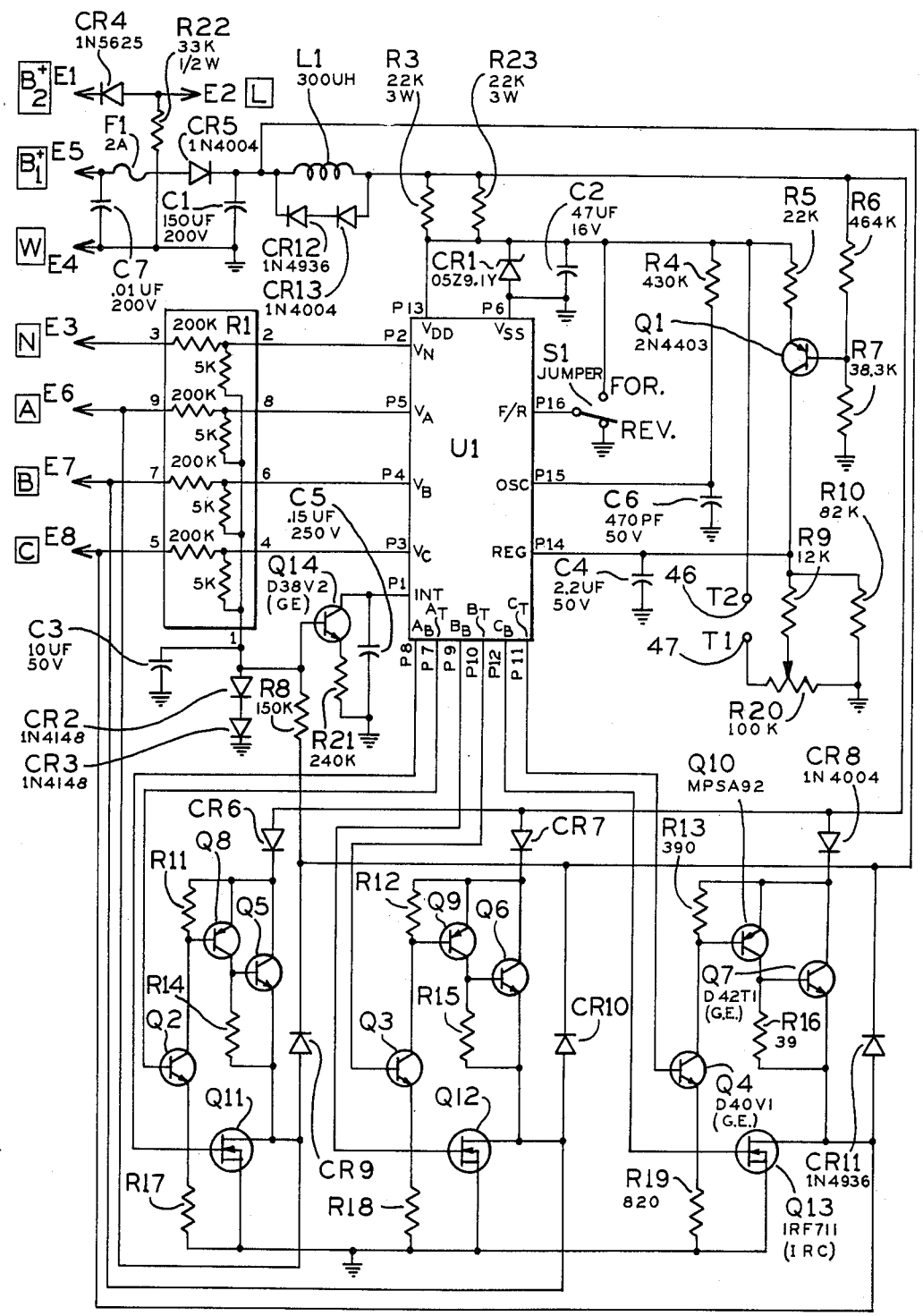
FIG. 5 is a schematic, including the identification of components and values therefor, of the circuit shown in FIG. 4.

For the purpose of providing a complete disclosure herein, all of the circuit elements in FIG. 5 hereof have been identified by component symbols (e.g., R3, R23, CR12, CR13, etc.) that correspond to the elements illustrated in FIG. 4 on the board 37. Moreover, generic designations of each of the elements shown in FIG. 5 are provided where appropriate. Since three identical power switching circuits are used (comprising, for example, CR6, R11, Q8, Q5, R14, Q2, Q11, R17, CR9 for winding phase "A"); component specifications have been applied only to those used for switching or commutating motor winding phase "C" (i.e., CR8, R13, Q10, Q7, R16, Q4, Q13, R19, CR11).

In the case of components specified by a particular company's part designation instead of a generic designation, the identity of the source company is also provided. For example, the transistors Q7 and Q4 are General Electric Company transistors and thus are identified with the parenthetical reference "(GE)" in FIG. 5. Similarly, transistor Q13 was an International Rectifier Corporation (IRC) part; while diode CR1 is Toshiba part 05Z9.1Y, and resistance network R1 may be a Caddock part T1794-140-2.

Figure 2:
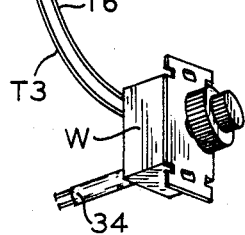
FIG. 2 is a view of a fragmentary portion of a prior art circuit board for a circuit essentially as described in the above-referenced Bitting et al application, Ser. No. 502,601.
Figure 2:
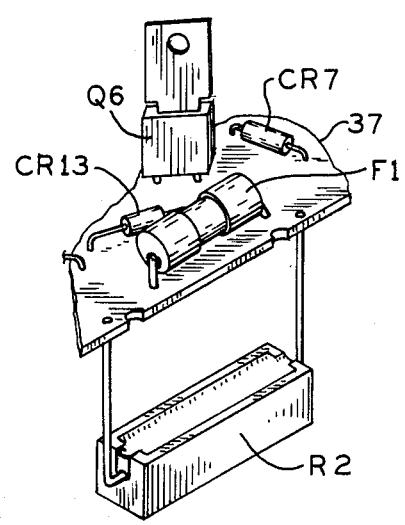
Figure 3:
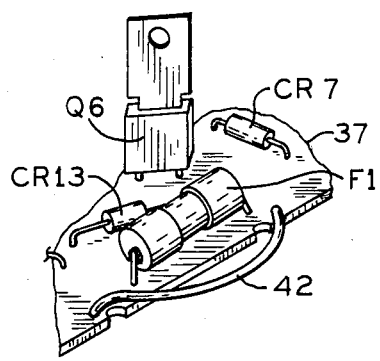
FIG. 3 is a view in perspective, with parts removed and parts broken away, of the structure shown in FIG. 2 but modified for use in conjunction with embodiments of the present invention.

There are a few minor variations in the circuit of FIG. 5 as compared to the FIG. 2 circuit in the referenced Bitting et al application. Those variations and the reasons for them will now be presented. In FIG. 5 resistors R3 and R23, both 22K ohm resistors, are connected in parallel whereas the Bitting et al circuit utilized only a single 15K ohm resistor. The reason for this change is that for production purposes more latitude in utilization of integrated circuit U1 results. Resistors R6 and R7 in FIG. 5 also differ in value from the corresponding resistors in the Bitting et al circuit in that R6 and R7 are 464K and 38.3K ohms respectively, whereas the corresponding resistors in the Bitting et al FIG. 2 circuit are 430K and 36K ohms respectively. Moreover, resistors R6 and R7 are one percent tolerance resistors rated at one quarter watts. The reason for this change is to provide for a more precision desired voltage on pad 14 of the integrated circuit U1. This change was made because the integrated circuit in the Bitting circuit (corresponding to integrated circuit U1 in FIG. 5) was a prototype chip as opposed to a production chip. It is noted that all of the resistors shown in FIG. 5 are one quarter watt resistors with the exception of the previously mentioned three watt resistors R3 and R23, and with the exception of resistor R22 which is a one-half watt resistor. Furthermore, only resistors R6 and R7 are one percent tolerance resistors, with all other discrete resistors illustrated being five percent tolerance resistors.

Another variation in FIG. 5 as compared to the Bitting et al FIG. 2 circuit is that the terminals 46 and 47 in FIG. 5 are open. In the Bitting et al circuit, the portion of the circuit in question would be continuous between terminal points 46 and 47 as if they were interconnected with a jumper. With this variation, the variable resistor R20 is used in FIG. 5 herein as a trim pot for trimming the voltage at pad 14 of the integrated circuit U1 in each individual circuit application. If desired, terminals 46 and 47 may be connected together with a jumper and, in that event, the variable resistor R20 can be used as a motor speed control as described in the Bitting et al application.

Resistors R9 and R10 in FIG. 5 also have different values (vis-a-vis Bitting et al) in that the Bitting et al resistor corresponding to resistor R9 in FIG. 5 had a resistance of 150K ohms, and the Bitting et al resistor corresponding to resistor R10, had a resistance of 39K ohms. These variations were arrived at in order to provide the desired voltage level at pad 14 of integrated circuit U1.

The resistors R17, R18, and R19 (each 820 ohms) in FIG. 5 also differ from their counterparts in the Bitting et al circuit in that in the Bitting et al case the corresponding resistors each had a resistance of 2.7K ohms. This change was made to provide a slightly higher level of gain (higher levels of current flow) for the transistors Q2 and Q8 in the case of resistor R17; and the transistors Q3, Q9; and Q4, Q10; in the case of resistors R18 and R19 respectively in FIG. 5.

Figure 7:
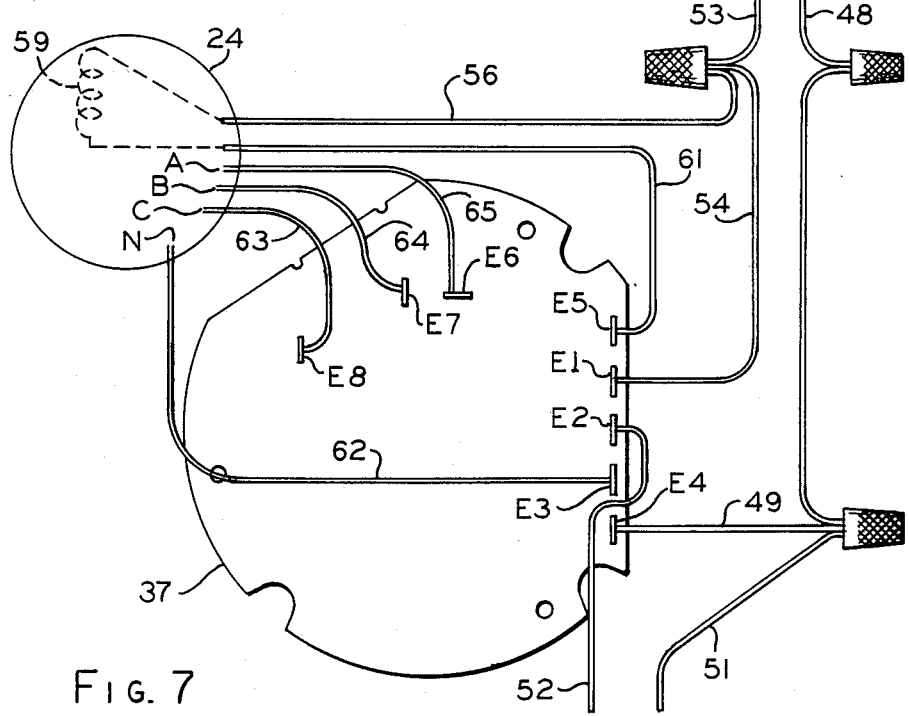
FIG. 7 is a wiring diagram showing the interrelationships and wiring connections for the fan motor circuit board, light fixture, a radio frequency interference filter, and a wall control as described in the above-referenced Peil application.

Although it would be apparent from comparing the Bitting et al circuit with FIG. 5, it is noted in the interest of clarity of description that the circuit lines 48 and 49 in FIG. 7 are, in effect, each a bus of +150 volts (filtered DC). Other differences between the circuit illustrated in FIG. 5 and the Bitting et al circuit reside in the fact that the Bitting et al circuit included a three ohm current surge suppressing resistor in series with the fuse F1 whereas such resistor has been omitted from the circuit of FIG. 5 in accordance with one aspect of the present invention.

The integrated circuit U1 in FIG. 5 is described in complete detail in the referenced Bitting et al application Ser. No. 502,601 in a section of that specification identified as a "Motor Control IC" at pages 26 through 47 therein. Moreover, the details of the integrated circuit U1 in FIG. 5 are fully illustrated in the Bitting et al application drawings. Since these components are essentially identical (save for minor variations in performance due to differences between prototype chips and production chips), further description of integrated circuit U1 is not presented herein except to note that it is manufactured by the Intersil Company.

By comparison of FIGS. 4, 5 and 7 it should now be apparent that the terminals E1 through E8 on the circuit board 37 correspond to similarly identified terminal points in the circuit of FIG. 5. To facilitate understanding, symbols within boxes have also been provided on FIG. 5 to indicate the nature of the connection to be made with the various terminals E1-E8. For example, the light fixture mentioned hereinabove (denoted by "L" in FIG. 5) in connection with FIG. 1 is connected to terminal E2. One side of the power supply line is connected directly to terminal E1 and this represents a B2+ bus line. The B2+ bus line is also connected to one side of the special motor winding described hereinabove (shown in phantom in FIG. 7 and discussed in more detail hereinabove). Thus power is supplied through the special winding 59 (which acts as a current surge suppressing resistor) and is then applied at terminal E5 as a B1+ voltage.

The other side of the line is connected, through the wall control "W" to the terminal E4. Terminal E3 is a neutral "N" or common connection for the motor energization windings. On the other hand, terminals E6, E7, and E8 are connected, respectively, to winding phases A, B, and C of the motor (all as will be described in more detail hereinbelow).

FIG. 7 further shows the relationship of RFI filter 26, wall control W, and the 115 volt supply line.

With specific reference to FIG. 7 it will be appreciated that one side of the main is connected directly with one of the input leads of the filter 26. The other side of the main is connected in series with the other input lead T3 of the filter 26 through the wall control W. Output line 48 from the filter 26 is then connected, by means of line 48 and jumper 49 to terminal E4 of the circuit board 37. Line 48 is also connected, via lead 51 to one side of a light of the previously described light fixtures. The other side of the light fixture L is connected by means of lead 52 to the circuit board terminal E2. The lead 53 is connected, by means of a jumper 54 to circuit board terminal E1 (to thus bypass winding 59) while lead 56 interconnects the lead 53 with one side of the special current surge suppressing motor winding 59 which is buried inside the motor 24. The other side of the winding 59 is connected by means of lead 61 to circuit board terminal E5.

The common or neutral lead 62, connected to terminal E3, connects with a common connection N of the three phase windings inside the motor 24. Similarly, leads 63-65 interconnect the circuit board terminals E6, E7, and E8 with the three phase windings inside the motor 24.

Figure 6:
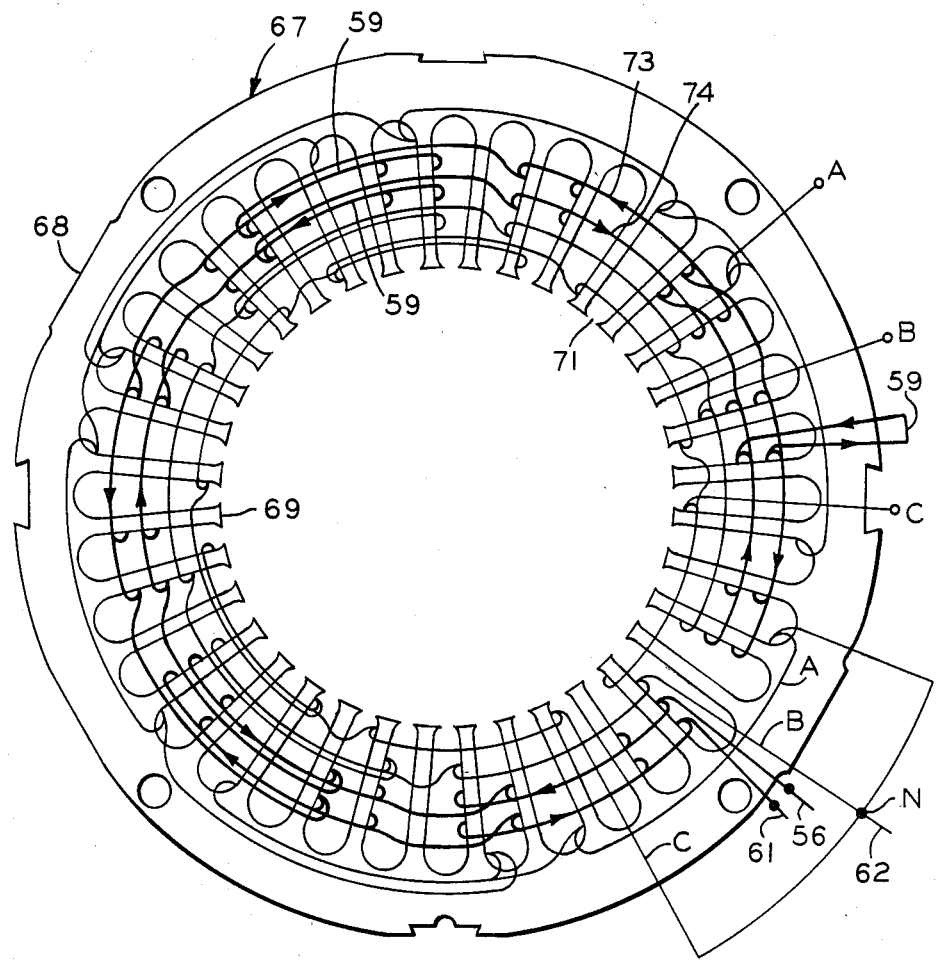
FIG. 6 is a diagramatic representation of the laminated magnetic core and windings of the fan motor shown in FIG. 1.

Before turning to FIG. 6 and presenting a detailed description of the motor structure thereshown, it is noted at this point that the steering diodes in the wall control W (as discussed in great length in the above-referenced Peil application) co-act with the polarity of diodes CR4 and CR5 (see FIG. 5) in order to permit independent control of the power delivered to the motor 24 and the light L with the single wall control W.

Turning now to FIG. 6, the stator structure 67 of the motor 24 will be described. The stator 67 includes a magnetizable core 68 which preferably is a laminar steel structure. Such structure may be comprised of a plurality of flat plate like laminations or may be a spirally wound "slinky" type of structure. As will be understood by persons skilled in the motor art, the core 68 includes a central bore 69 which accommodates a rotating structure (in the case of the electronically commutated motor herein described, such structure is a permanent magnet rotor). Opening onto the bore 69 are a plurality of slots 71 and such slots accommodate excitation windings. Three stages or "phases" of windings A, B, and C, respectively, are disposed about the core 68 as illustrated. It will be noted that each phase comprises six concentrated coils (also called poles in the context of motor 24), the centers of which are angularly displaced about the core 68. One end of each of the phase windings A, B, C are connected together at a common connection "N", to which lead 62 in turn is connected.

The technology regarding motors such as a motor 24 is fully described in the incorporated by reference Erdman, Erdman et al, and Bitting et al applications. Accordingly, further description of such motor parts is not herein presented except to note that each of the phase windings A, B, and C were wound with 320 turns of wire per coil, with the winding turns formed from 0.0106 inch diameter copper wire and the resistance of each of the winding phases being about 105 ohms.

Also illustrated in FIG. 6 is the special winding section 59 which was formed of 0.0126 inch diameter copper wire wound with ten turns of wire about three teeth and thirteen turns of wire around five teeth at six different angularly spaced locations about the stator 68 (as clearly shown in FIG. 6). The ohmic resistance measured across the leads 56, 61 for the special winding 59 was approximately 9 ohms. For ease of manufacture, the special winding section 59 was wound as a bifilar winding and had electrical continuity as illustrated in FIG. 6.

It now should be appreciated that, in accordance with the present invention, we have provided a means (i.e. the special winding 59) for suppressing current surges in the supply for an electronic switching circuit such that heat associated with such dissipation will be dissipated inside a relatively massive motor structure rather than from a component mounted to an electronic circuit board carrying the control circuit.

With the winding 59 wound as illustrated in FIG. 6 so that the current flow therein will be as denoted by the arrows 73, 74, no net flux will be produced by such winding. This phenomena is in fact known in the motor art. For example, as described and shown in Smith et al U.S. Pat. No. 3,633,057 of Jan. 4, 1972, (assigned to the assignee of the present application), windings called "backlash windings" have long been used in the hermetically sealed motor industry. This type of winding has been used in order to provide desired resistance-to-reactance ratios of main and auxiliary windings in order to obtain both desired levels of starting torque and desired start relay operation.

Johnson U.S. Pat. No. 3,774,062 of Nov. 20, 1973, describes, in columns 3 and 4 thereof, some of the historical development of the hermetic motor art. As pointed out by Johnson, external resistors at first were used in series with hermetic motor starting windings in order to obtain desired high starting circuit resistance levels without excessive winding current densities and temperature rises. As that art evolved, extra winding turns were provided internally of hermetic motors arranged in series circuit relationship with the start winding but having the wire turns associated with the extra winding material arranged so that no net inductive effect would result from the addition of such extra winding turns. The Johnson patent itself teaches the use of a relatively high resistance aluminium alloy wire as start winding material in order to substantially reduce (and in preferred situations eliminate) the noninductive "backlash" winding sections that had been used up to that point in time.

It is emphasized that motor arrangements utilizing the concepts of the present invention are distinguishable from the "backlash" winding techniques used in the hermetic motor environments just discussed. More specifically, the external resistors mentioned in the Johnson patent and the backlash winding sections which ultimately replaced such resistors carried motor excitation current. Also, the purpose of such winding sections was to effectively change the resistance of the motor start winding without substantially affecting the inductive reactance of such winding. Moreover, the reason for using the external resistor or backlash winding technique was so that the current (as a function of time and thus as a function of speed as the motor started) could in effect be tailored to satisfy the current specifications for a starting relay.

In contrast to the above, special winding 59 shown herein carries only current that is supplied to the control circuit carried on circuit board 37 (see FIG. 4). None of the excitation current of any of the winding phases of motor 24 is carried in the special winding section 59. Moreover, alternating power (and thus current) was supplied in the hermetic motor backlash winding sections mentioned hereinabove; whereas only filtered, pulsating, direct current is applied to the power switching transistors in the circuit of FIG. 5.

There has now been shown and described methods and apparatus which fulfill the objects of the present invention discussed at the beginning of this specification. More specifically, a new method has been disclosed of operating an electronically controlled motor system (which includes a stator structure, excitation windings, an electronic control circuit for controlling energization of such windings, and means for suppressing current surges in the control circuit which generate heat while so suppressing the current surges). In accordance with one preferred method, however, means are effective for suppressing current surges in the control circuit during controlled energization of motor excitation windings, while dissipating heat generated by such means for suppressing along the motor stator structure.

It should be specifically noted with reference to FIG. 6 that the special winding 59 is shown embedded within the phase windings of the motor. Thus, heat generated within the special current surge suppressing winding section 59 is dissipated along the same heat transfer paths as the heat generated due to energization of the phase winding A-C.

Although the arrangement illustrated in FIG. 6 results in some additional heat being introduced into the stator structure 67, the temperature rise of such structure has not been increased to objectionable levels. In one specific example that was studied, the winding temperatures, shell temperatures, and selected transistor temperatures when a special three ohm winding section was used was compared to corresponding temperatures when a five watt resistor R2 (3 ohms) was mounted on the circuit board as shown in FIG. 2. In both cases, the temperature of the phase windings A-C were below 150° C.

Depending upon the particular kind of control circuit to be used with a given motor, different resistive values for a winding section corresponding to the special winding section 59 may be desired. However, it is presently believed that for the specific circuit illustrated in FIG. 5 coupled with motor 24, it is preferable for the winding section 59 to have a resistance of nine ohms. When initial prototype motors embodying the invention were made, the current surge resisting winding section therein had a resistance of about three ohms. However, we have determined that by making the resistance of the section 59 nine ohms, there is a substantial reduction of ripple current in capacitor C1 which reduces internal heating of capacitor C1. This reduces heat generated on board 37 and should also lead to an increased life for that capacitor.

Prototypes of motor 24 that were made and tested had approximately 60 watts input and about 20 watts output power. The outer diameter of the core shown in FIG. 5 was approximately 5½ inches, the diameter of the bore 69 was about 3¼ inches, and the stack heighth (or axial length) of the core itself was three-fourths of an inch.

For purposes of further comparison, with a motor 24 substantially as has been described herein, except that the surge suppression winding thereof was only three ohms, the shell or housing temperature of the motor was 111.8° C. which is well below an allowable temperature of 175° C. on the particular type of motor under consideration.

During the aforementioned test, the increase in main winding temperature (i.e., the temperature of the winding phases A-C) after the inclusion of the surge suppression winding was under 10° C. Moreover, the temperatures of transistors Q3, Q7, and Q13 were reduced from 5° C. to 7° C. when the resistor R2 shown in FIG. 2 was replaced by the three ohm special winding section. It should be noted that the transistors Q3, Q7, and Q13 were chosen because of their relative proximity to another relatively intense source of heat on circuit board 37—i.e., resistors R3 and R23 (which, for purposes of economy, replaced a single 11K ohm six watt resistor which was actually used during the test).

During the particular heat run just described, the entire fan combination of FIG. 1 was run as a complete fan and light unit. In other words, the circuit board 37 was inside the decorative conduit box 32 and a light fixture was suspended on a short piece of conduit threaded into the opening 33. The fixture included a 150 watt incandescent bulb energized to maximum brightness. The heat data mentioned hereinabove was taken for the most elevated temperature operating condition possible which was a situation with the fan set on high speed, the 150 watt lightbulb turned full on. The fan comprised four paddles as shown having a 52 inch wing span, a fan blade width at the outer end thereof of six inches (5¼ inches at the inner end thereof), a fan blade length (tip to tip of a single blade) of about 21 inches and a fan blade pitch of 14°.

In view of all of the foregoing, it should now be understood that we have provided current surge suppressing means that protect circuit board mounted electronic motor control components without directly heating the protected components with the surge suppression means.

While the present invention has been disclosed in conjunction with a particular type of motor and motor control in the form of a brushless DC motor and control therefor, it should be understood that it could have application in other types of motor arrangements. Thus, the foregoing should be taken as being exemplary, and the invention itself should be limited only by the scope of the claims that are appended hereto and that form part of our disclosure.

What we claim as new and desire to secure by Letters Patent of the United States is:

1. A method of operating an electronically controlled motor having a structure comprising a stator having at least one excitation winding accommodated on a magnetic core, an electronic control circuit for controlling energization of the excitation winding during motor operation; and means for suppressing current surges in the control circuit and for generating heat while so suppressing current surges, the method comprising the steps of: controlling energization of the motor excitation windings with the electronic control circuit; suppressing current surges in the control circuit with the means for suppressing; and dissipating heat generated by the means for suppressing along the motor structure.

2. The method of claim 1 wherein the motor is an electronically commutated motor, the means for suppressing current surges comprises a plurality of turns of wire accommodated on the magnetic core in close proximity with the at least one excitation winding, and the step of dissipating involves dissipating heat along the core of the stator.

3. In an electronically commutated motor particularly adapted for use in combination with an electronic switching control circuit, comprising a stator having a magnetic core and at least one excitation winding, the improvement comprising a current surge suppressing winding accommodated on the stator, and having means for connecting the suppressing winding in series circuit relationship with the control circuit.

4. The invention of claim 3 wherein the means for connecting comprise end terminations of the surge suppressing winding.

5. An electronically commutated motor system comprising an electronically commutatable motor, a compartment for an electronic control circuit, an electronic control circuit disposed in said compartment for commutating said motor, and current surge suppressing means connected in series circuit relation with said electronic control circuit; wherein said surge suppressing means is carried by said motor and is located remotely from said compartment.

6. The invention of claim 5 wherein the motor includes a magnetic core and the surge suppressing means comprises a plurality of wire turns accomodated on said core.

7. A method of operating an electronically controlled motor having a structure comprising a stator having at least one excitation winding accomodated on a magnetic core, an electronic control circuit for controlling energization of the excitation winding during motor operation; and resistor means associated with and forming part of the control circuit that generates heat during operation of the control circuit, the method comprising the steps of: locating said resistor means along the motor structure remote from other components of the control circuit; controlling energization of the motor excitation windings with the electronic control circuit; passing control circuit current through said resistor means and causing said resistor means to become heated; and dissipating heat generated in the resistor means along the motor structure.

8. The method of claim 7 wherein the motor is an electronically commutated motor, the resistor means comprises a plurality of turns of wire accommodated on the magnetic core in close proximity with the at least one excitation winding, and the step of dissipating involves dissipating heat along the core of the stator.

9. A method of manufacturing at least part of an electronically commutated motor having a structure comprising a stator having at least one excitation winding accommodated on a magnetic core, an electronic control circuit for controlling energization of the excitation winding during motor operation, and at least one resistor particularly adapted as an electrical circuit element associated with the electronic control circuit for carrying current that is carried by at least one other electronic component that forms part of the electronic control circuit, the method comprising the steps of accommodating the at least one excitation winding on the magnetic core, accommodating the at least one resistor on the magnetic core in heat transfer relationship thereto, and subsequently interconnecting the at least one resistor with at least one other component of the electronic control circuit.

10. In an electronically commutated motor particularly adapted for use in combination with an electronic control circuit, comprising a stator having a magnetic core and at least one excitation winding, the improvement comprising a wire wound resistor component of the control circuit accommodated on the stator, and means for connecting the wire wound resistor in circuit relationship with at least one other component of the control circuit.

11. The invention of claim 10 wherein the means for connecting comprise at least one end termination of the wire wound resistor.

12. An electronically commutated motor system comprising an electronically commutatable motor, a circuit board mounted electronic control circuit for controlling said motor, and a wire wound resistor connected with and electrically forming a part of said electronic control circuit; wherein said wire wound resistor is carried by said motor and is located remotely from said circuit board.

13. The invention of claim 12 wherein the motor includes a magnetic core and the wire wound resistor comprises a plurality of wire turns accommodated on said core.

14. The invention of claim 13 wherein the motor includes excitation winding turns, and turns of the resistor and excitation winding are accommodated on the magnetic core in proximity with one another.

* * * * *